US009611813B2

(12) United States Patent
Dudar

(10) Patent No.: US 9,611,813 B2
(45) Date of Patent: Apr. 4, 2017

(54) ON-BOARD METHOD TO SMOKE TEST A VEHICLE'S EVAP SYSTEM USING EXHAUST GAS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 297 days.

(21) Appl. No.: 14/300,156

(22) Filed: Jun. 9, 2014

(65) Prior Publication Data

US 2015/0354510 A1 Dec. 10, 2015

(51) Int. Cl.
*G01M 3/04* (2006.01)
*F02M 25/08* (2006.01)

(52) U.S. Cl.
CPC ................................ *F02M 25/0818* (2013.01)

(58) Field of Classification Search
USPC ........................................................... 73/40.7
See application file for complete search history.

(56) References Cited

U.S. PATENT DOCUMENTS 5,107,698 A * 4/1992 Gilliam ................... G01M 3/20 73/40.7
5,816,217 A 10/1998 Wong
6,089,081 A * 7/2000 Cook ................. F02M 25/0809 73/114.39
6,330,878 B1 * 12/2001 Perry ................. F02M 25/0836 123/519
6,392,227 B1 5/2002 Banyard et al.
6,446,492 B2 * 9/2002 Weldon .............. F02M 25/0818 73/49.2
6,477,890 B1 11/2002 Hulsebus
6,526,808 B1 3/2003 Pieroni et al.
6,907,771 B2 6/2005 Finlay et al.
7,063,076 B1 6/2006 Sun
7,331,334 B2 * 2/2008 Leone ..................... F02M 25/08 123/516
7,469,684 B2 12/2008 Leone et al.
7,878,046 B2 * 2/2011 Bolt ................... F02M 25/0809 73/49.7
8,413,433 B2 * 4/2013 Lupescu ................ F02M 25/12 123/518
8,737,826 B2 5/2014 Stauffer et al.
(Continued)

OTHER PUBLICATIONS

Anonymous, "A Method to Utilize a Vehicle's Own Exhaust Gas to Smoke Test the Evap System," IPCOM No. 000235489, Published Mar. 4, 2014, 2 pages.

*Primary Examiner* — Clayton E Laballe
*Assistant Examiner* — Warren K Fenwick
(74) *Attorney, Agent, or Firm* — James Dottavio; McCoy Russell LLP

(57) ABSTRACT

Systems and methods for smoke testing an evaporative emissions control system of a vehicle using exhaust gas are disclosed. In one example, a method for an engine comprises: during a first condition, routing exhaust gas to a sealed fuel system; and pressurizing the fuel system with the exhaust gas such that exhaust gas will escape from a leak in the fuel system. In this way, the location and the size of an evap system leak may be determined without the need for, and without using, expensive off-board testing equipment.

18 Claims, 4 Drawing Sheets

(56) References Cited

U.S. PATENT DOCUMENTS

| | | | | |
|---|---|---|---|---|
| 2012/0201522 | A1 | 8/2012 | Stauffer et al. | |
| 2014/0257721 | A1* | 9/2014 | Thompson ............ | G01M 3/226<br>702/51 |
| 2015/0090008 | A1* | 4/2015 | Pearce ............... | F02M 25/0809<br>73/40.7 |
| 2015/0153254 | A1* | 6/2015 | Silvis .................... | G01M 15/10<br>73/864 |

* cited by examiner

ON-BOARD METHOD TO SMOKE TEST A VEHICLE'S EVAP SYSTEM USING EXHAUST GAS

FIELD OF THE INVENTION

The present application relates generally to the control of a vehicle, and particularly to a system and method for determining a location and size of a leak in an evap system of a vehicle.

BACKGROUND AND SUMMARY

Automotive vehicles include evaporative emissions control, or evap, systems to minimize the release of hydrocarbons into the atmosphere. Government regulations require on-board diagnostics for evap systems such as leak detection. When an emissions leak is detected, an automotive repair technician or mechanic may conduct a smoke test to locate the leak so that the leaking component may be repaired or replaced. Such tests require the use of a smoke tester, an apparatus that generates smoke by heating mineral oil.

However, the typical smoke tester is large, expensive, and requires intrusive connections and disconnections to the evaporative emissions system that can introduce variability and new leaks in the system. New leaks in the system could exacerbate the release of hydrocarbons into the atmosphere. Furthermore, the design and use of smoke testers may be inconsistent and provide variable diagnostics depending on the location of the leak, size of the leak, etc.

The inventors herein have recognized the above issues and have devised systems and methods to address them. In particular, systems and methods for smoke testing an evaporative emissions control system of a vehicle using exhaust gas are disclosed. In one example, a method for an engine comprises: during a first condition, routing exhaust gas to a sealed fuel system; and pressurizing the fuel system with the exhaust gas such that exhaust gas will escape from a leak in the fuel system. In this way, the location of an evap system leak may be detected using an on-board smoke test that creates a visual indication for technicians. Further, such operation provides for controlled evaporative emission leak location diagnostics that can lead to decreased emissions while reducing the possibility of degrading vehicle components.

In another example, a method for a vehicle including an evaporative emissions system coupled to an exhaust system comprises: closing a canister purge valve and a canister vent valve responsive to receiving instructions to initiate a smoke test; adjusting a combustion air-fuel ratio to a rich setpoint to generate smoke; opening an exhaust flow valve to allow exhaust gas from the exhaust system to flow into the evaporative emissions system; closing the exhaust flow valve responsive to an evaporative emissions system pressure at a threshold; monitoring a pressure decay rate responsive to closing the exhaust flow valve; and estimating a leak size using the pressure decay rate. In this way, the location and the size of an evap system leak may be determined without the need for, and without using, expensive off-board testing equipment.

In another example, an evaporative emissions system coupled to an internal combustion engine in a vehicle comprises: a canister containing an adsorbent material, the canister fluidly coupled to a fuel system and an engine intake; a canister purge valve positioned downstream of the canister and upstream of the engine intake; a canister vent valve positioned in a vent line upstream of the canister and downstream of an atmosphere; an exhaust flow valve positioned within an exhaust cross passage, the exhaust cross passage coupled between the vent line and an exhaust passage; a controller configured with instructions stored in non-transitory memory that when executed cause the controller to: close the canister purge valve and the canister vent solenoid responsive to a smoke test initiation; open the exhaust flow valve to allow exhaust gas to enter the evaporative emissions system; and close the exhaust flow valve responsive to an evaporative emissions system pressure above a threshold. In this way, a vehicle may include all of the hardware necessary to identify an evap system leak using exhaust gas without the need for expensive test equipment.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
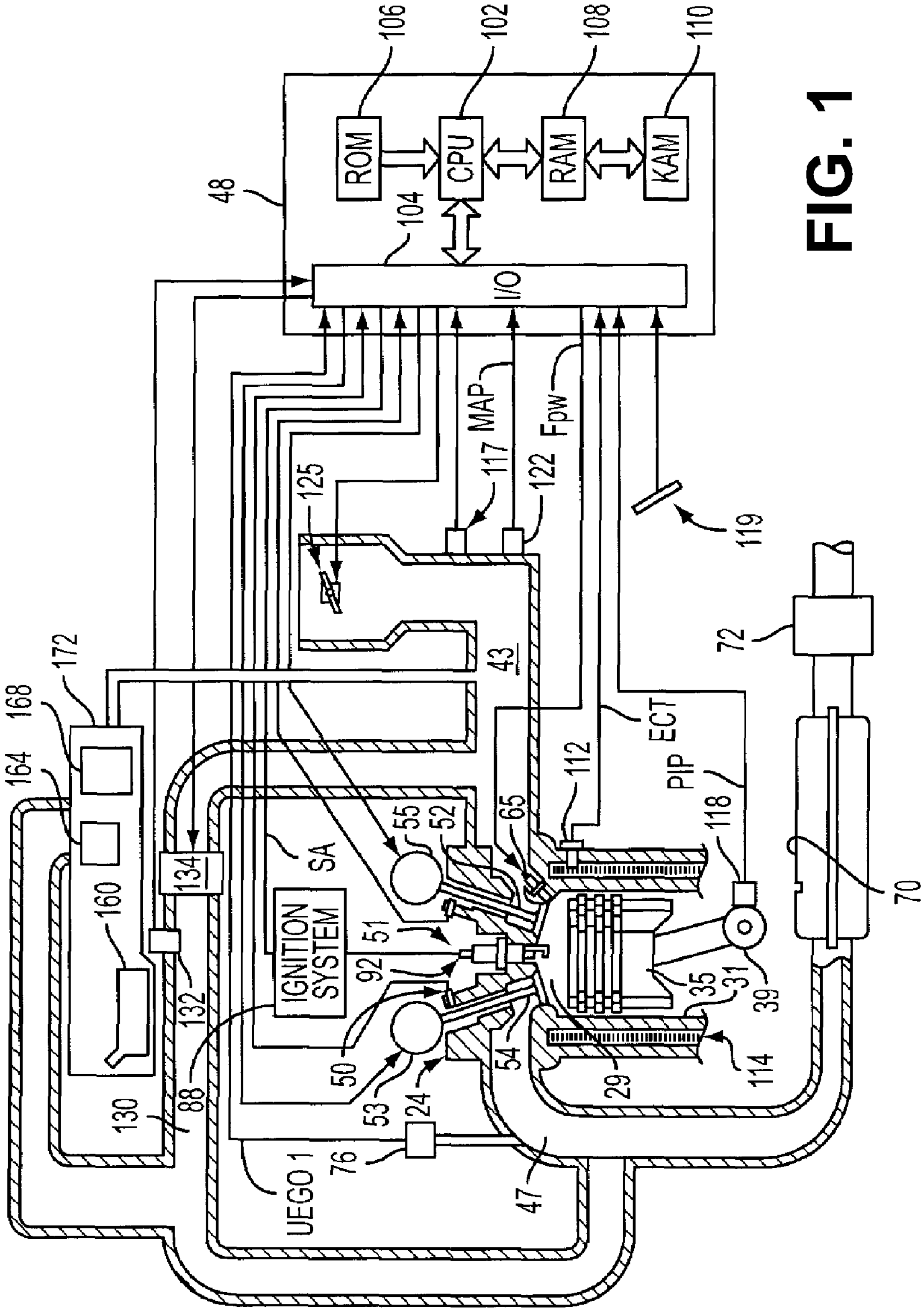
FIG. 1 schematically shows an example engine system.
Figure 2:
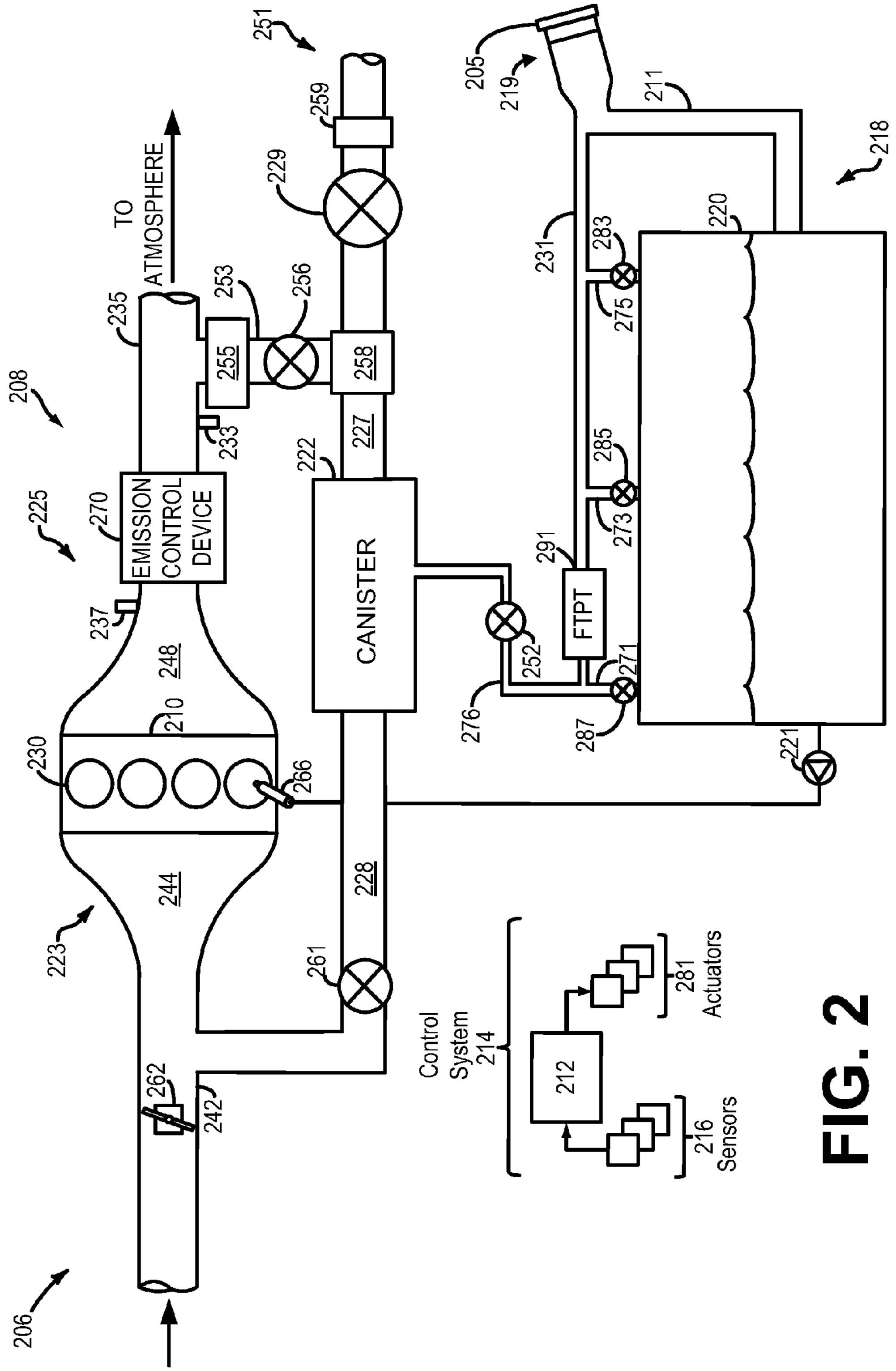
FIG. 2 schematically shows an example vehicle system with a fuel system and an emissions control system.
Figure 3:
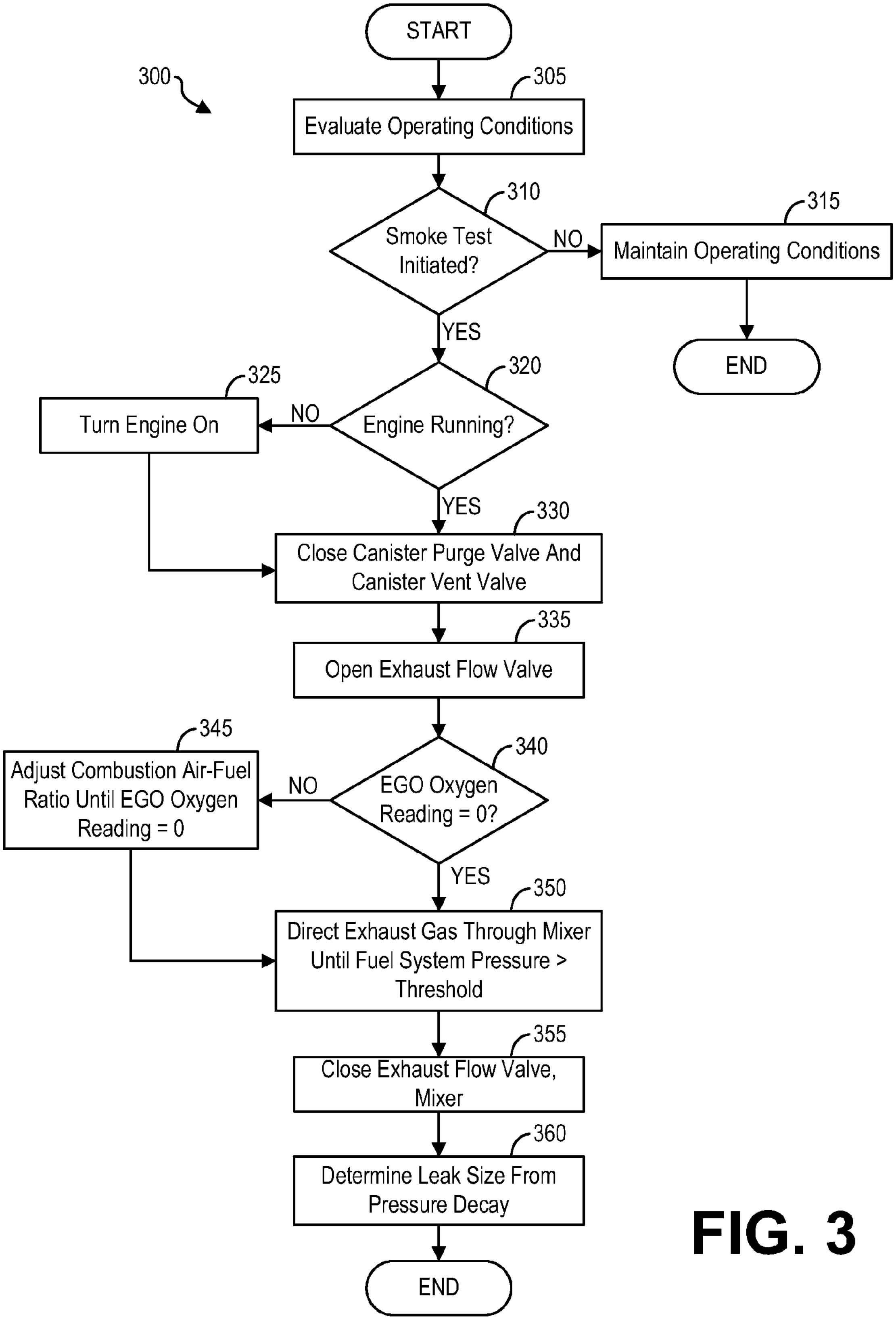
FIG. 3 depicts a flow chart for an example high-level method for performing an on-board smoke test.
Figure 4:
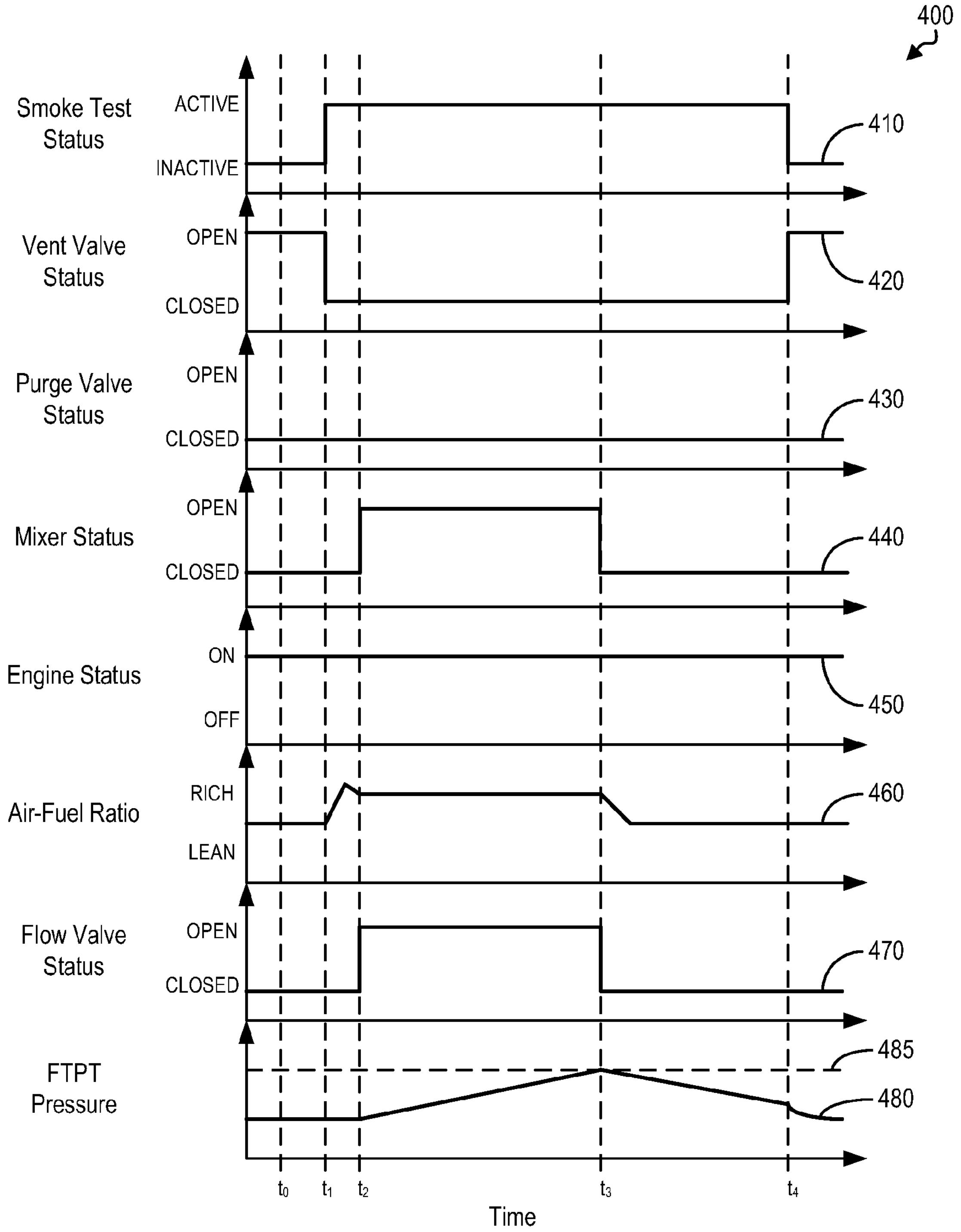
FIG. 4 shows an example timeline for an on-board smoke test using the method depicted in FIG. 3.

The present description is related to assisting a technician in visually determining the location of an evaporative emissions control system leak using an on-board smoke test in an engine such as the one shown in FIG. 1, where the location of smoke exiting the system indicates the location of the leak to the technician. The vehicle may include an evaporative emissions control system coupled to an exhaust after-treatment system as shown in FIG. 2. The evaporative emissions control system may be coupled to the exhaust after-treatment system so that heated exhaust gas may be used to purge the canister, thereby increasing the efficiency of canister purge operations. The hardware components included in the vehicle for using exhaust gas to purge the canister may also be used in an on-board smoke test in order to locate the location of a leak in the evaporative emissions control system. FIG. 3 shows an example method for performing an on-board smoke test using the system of FIG. 2. FIG. 4 illustrates an example timeline for an on-board smoke test using the method of FIG. 3.

FIG. 1 shows an example engine 24 as a direct injection gasoline engine with a spark plug; however, engine 24 may be a port injection gasoline engine, or a diesel engine without a spark plug, or another type of engine. Internal combustion engine 24 may include a plurality of cylinders, one cylinder of which is shown in FIG. 1, which is controlled by electronic engine controller 48. Engine 24 includes combustion chamber 29 and cylinder walls 31 with piston 35 positioned therein and connected to crankshaft 39. Combustion chamber 29 is shown communicating with intake manifold 43 and exhaust manifold 47 via respective intake valve 52 and exhaust valve 54. While only one intake and one exhaust valve are shown, the engine may be configured with a plurality of intake and/or exhaust valves.

Engine 24 is further shown configured with an exhaust gas recirculation (EGR) system configured to supply exhaust gas to intake manifold 43 from exhaust manifold 47 via EGR passage 130. The amount of exhaust gas supplied by the EGR system can be controlled by EGR valve 134. Further, the exhaust gas within EGR passage 130 may be monitored by an EGR sensor 132, which can be configured to measure temperature, pressure, gas concentration, etc. Under some conditions, the EGR system may be used to regulate the temperature of the air and fuel mixture within the combustion chamber, thus providing a method of controlling the timing of autoignition for HCCI combustion.

In some embodiments, as shown in FIG. 1, variable valve timing may be provided by variable cam timing (VCT); however other methods may be used such as electrically controlled valves. While in this example, independent intake cam timing and exhaust cam timing are shown, variable intake cam timing may be used with fixed exhaust cam timing, or vice versa. Also, various types of variable valve timing may be used, such as the hydraulic vane-type actuators 53 and 55 receiving respective cam timing control signals VCTE and VCTI from controller 48. Cam timing (exhaust and intake) position feedback can be provided via comparison of the crank signal PIP and signals from respective cam sensors 50 and 51.

In some embodiments, cam actuated exhaust valves may be used with electrically actuated intake valves, if desired. In such a case, the controller can determine whether the engine is being stopped or pre-positioned to a condition with the exhaust valve at least partially open, and if so, hold the intake valve(s) closed during at least a portion of the engine stopped duration to reduce communication between the intake and exhaust manifolds. In addition, intake manifold 43 is shown communicating with optional electronic throttle 125.

Engine 24 is also shown having fuel injector 65 coupled thereto for delivering liquid fuel in proportion to the pulse width of signal FPW from controller 48 directly to combustion chamber 29. As shown, the engine may be configured such that the fuel is injected directly into the engine cylinder, which is known to those skilled in the art as direct injection. Distributorless ignition system 88 provides ignition spark to combustion chamber 29 via spark plug 92 in response to controller 48. Universal Exhaust Gas Oxygen (UEGO) sensor 76 is shown coupled to exhaust manifold 47 upstream of catalytic converter 70. The signal from sensor 76 can be used to advantage during feedback air/fuel control in a conventional manner to maintain average air/fuel at stoichiometry during the stoichiometric homogeneous mode of operation.

Controller 48 is shown in FIG. 1 as a conventional microcomputer including: microprocessor unit 102, input/output ports 104, and read-only memory 106, random access memory 108, keep alive memory 110, and a conventional data bus. Controller 48 is shown receiving various signals from sensors coupled to engine 24, in addition to those signals previously discussed, including: engine coolant temperature (ECT) from temperature sensor 112 coupled to cooling sleeve 114; a pedal position sensor 119 coupled to an accelerator pedal; a measurement of engine manifold pressure (MAP) from pressure sensor 122 coupled to intake manifold 43; a measurement (ACT) of engine air charge temperature or manifold temperature from temperature sensor 117; and an engine position sensor from a Hall effect sensor 118 sensing crankshaft 39 position. In some embodiments, the requested wheel output can be determined by pedal position, vehicle speed, and/or engine operating conditions, etc. In one aspect of the present description, engine position sensor 118 produces a predetermined number of equally spaced pulses every revolution of the crankshaft from which engine speed (RPM) can be determined.

FIG. 1 shows engine 24 configured with an exhaust after-treatment system comprising a catalytic converter 70 and a lean NOx trap 72. In this particular example, the temperatures of catalytic converter 70 and/or NOx trap 72 may be measured by temperature sensors in the devices or in the exhaust manifold, or may be estimated based on operating conditions. Further, exhaust gas oxygen sensors may be arranged in exhaust passage 47 upstream and/or downstream of lean NOx trap 72. Lean NOx trap 72 may include a three-way catalyst that is configured to adsorb NOx when engine 24 is operating lean of stoichiometry. The adsorbed NOx can be subsequently reacted with HC and CO and catalyzed when controller 48 causes engine 24 to operate in either a rich homogeneous mode or a near stoichiometric homogeneous mode. Such operation occurs during a NOx purge cycle when it is desired to purge stored NOx from the lean NOx trap, or during a vapor purge cycle to recover fuel vapors from fuel tank 160 and fuel vapor storage canister 164 via purge control valve 168, or during operating modes requiring more engine power, or during operation modes regulating temperature of the emission control devices such as catalyst 70 or lean NOx trap 72. It will be understood that various different types and configurations of emission control devices and purging systems may be employed.

As described herein, engine 24 may include a fuel vapor purge system comprising fuel tank 160, fuel vapor storage device 164 (which may be a charcoal canister), and purge control valve 168 fluidly coupled to intake manifold 43. Further, as shown in FIG. 1, exhaust gas may be routed to the purge system via system 172. While FIG. 1 shows one example of utilizing exhaust gas in a fuel vapor purge system, an alternative example is described herein and with regard to FIG. 2.

Returning to FIG. 1, some of the engine exhaust gas is routed through the charcoal canister and then back into the engine intake manifold. Such an approach may enable more efficient purging with a lower volume of gas flow due to increased exhaust gas temperature compared with fresh air. Such an approach may be particularly suitable for HCCI operation, which may run extremely lean and/or with high amounts of EGR. Specifically, since HCCI engines may operate with larger amounts of EGR, it may be possible to enable larger amounts of exhaust to be used for purging the stored fuel vapors. Further, since HCCI exhaust temperature may be lower than exhaust temperature during spark ignition operation (SI) or other engine modes, this may lower the potential of excessive heat causing degradation to the charcoal canister. Note, however, that the use of exhaust gas, such as exhaust gas recirculation (EGR) gas, to aid purging is not limited to HCCI engine operation. For example, it may be used with cylinder deactivation, camless valvetrains, engine boosting (supercharging and/or turbocharging), various forms of variable valve timing, and/or lean burn.

For systems in which only exhaust gas, such as EGR, is used for purging fuel vapors without fresh air, at least during some conditions, EGR tolerance and temperature limits of the storage device, (e.g., charcoal canister), may be considered, alone or in combination. For example, if the charcoal canister can tolerate relatively high temperatures, then smaller amounts of hotter EGR can be used to purge the canister. Alternatively, if the EGR temperature is too high, the EGR may be cooled, so larger amounts of EGR can be used to purge the canister, and thus the engine's tolerance for EGR (combustion stability) may be considered.

Alternatively, if both fresh air and exhaust gas are used to purge fuel vapors, the temperature of the canister may be regulated by adjusting the relative and/or absolute amounts of the fresh air or exhaust gas, or combinations thereof. For example, depending on engine conditions (e.g. in HCCI or SI mode, higher vs. lower load, etc.), different amounts of fresh air and/or exhaust gas may be used to purge fuel vapors.

Still another advantage of utilizing exhaust gas for purging fuel vapors is that it may be possible to purge vapors even during un-throttled (or lightly throttled) conditions. For example, a one-way valve, such as a reed valve, can utilize exhaust pressure pulsations to drive the flow from the exhaust system to the canister, even if negative oscillations would otherwise reverse the flow directions.

In some embodiments, the internal combustion engine can be configured to operate in a plurality of purge states. For example, fuel vapors may be purged into all or a subset of engine cylinders operating in a particular combustion mode. Alternatively, the engine may be operated with different cylinders in different combustion modes, where fuel vapors are fed to all or a subset of cylinders or cylinder groups.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors. For example, an exhaust gas oxygen (EGO) sensor 237 is shown positioned upstream of emission control device 270, EGO sensor 237 configured to monitor the oxygen content of the exhaust gas.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel systems.

Vapors generated in fuel system 218 may be routed to an evaporative emissions control system 251 which includes a fuel vapor canister 222 via vapor recovery line 231, before being purged to the engine intake 223. Vapor recovery line may be coupled to fuel tank 220 via one or more conduits and may include one or more valves for isolating the fuel tank during certain conditions. For example, vapor recovery line 231 may be coupled to fuel tank 220 via one or more of a combination of conduits 271, 273, and 275.

Further, in some examples, one or more fuel tank vent valves may be included in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system 219 may include a refueling access seal 205 for sealing off the fuel filler system from the atmosphere. Refueling system 219 is coupled to fuel tank 220 via a fuel fill line or neck 211. In some embodiments, refueling system 219 may be a capless design.

Emissions control system 251 may include one or more emissions control devices, such as one or more fuel vapor canister 222 filled with an appropriate adsorbent. Canisters 222 are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake 244 is provided to the fuel vapor canister for purging. In some examples, vent line 227 may include an air filter 259 disposed therein upstream of a canister 222.

Flow of air and vapors between canister 222 and the atmosphere may be regulated by a canister vent valve 229. Canister vent valve 229 may be a normally open valve, so that fuel tank isolation valve (FTIV) 252 may control venting of fuel tank 220 with the atmosphere. FTIV 252 may be a normally closed valve that when opened allows for the venting of fuel vapors from fuel tank 220 to canister 222. Fuel vapors may then be vented to atmosphere via canister vent valve 229, or purged to engine intake system 223 via canister purge valve 261.

Exhaust system 225 may be fluidly coupled to emissions control system 251 via cross passage 253 so that exhaust gas may be used to purge canister 222. Cross passage 253 may be coupled to exhaust passage 235 downstream of emission control device 270 and to vent line 227 between canister 222 and vent valve 229. An exhaust flow valve 256 may be positioned between exhaust system 225 and emissions control system 251 within cross passage 253. When the engine is running and purging of canister 222 is desired, canister purge valve 261 and exhaust flow valve 256 may be opened to route exhaust gas from exhaust passage 235 through cross passage 253 into vent line 227, and purge fuel vapors from canister 222 into intake manifold 244. Exhaust flow valve 256 may be any type of one-way valve, but in one example may be a reed-type valve to enable pressure buildup in the presence of pulsating intake and exhaust manifold pressures.

Mixer 258 may be positioned at the intersection of cross passage 253 and vent line 227. Mixer 258 may be operable to control the relative amounts of fresh air and exhaust gas entering canister 222 via vent line 227. For example, mixing valve 258 may be configured such that, in a default state (e.g., 0% duty cycle) the path between vent valve 229 and canister 222 is unrestricted, while the path between exhaust flow valve 256 and canister 222 is completely restricted. In such a configuration, if vent valve 229 is open, fresh air may circulate freely between canister 222 and atmosphere, while no exhaust gas will enter vent line 227. In scenarios where the canister is to be purged exclusively with exhaust gas, mixer 258 may be placed in a state (e.g., 100% duty cycle) such that the path between vent valve 229 and canister 222 is completely restricted, while the path between exhaust flow valve 256 and canister 222 is unrestricted. In such a configuration, if exhaust flow valve 256 is open, exhaust may circulate freely to canister 222. Mixer 258 may further be placed in an intermediate position (e.g., between 0% and 100% duty cycle) to allow a commanded ratio of exhaust gas to fresh air to circulate to canister 222 while both vent valve 229 and exhaust flow valve 256 are open. In this way, mixer 258 enables purging of canister 222 using exhaust gas, fresh air, or combinations thereof. During conditions where vent valve 229 is open and exhaust flow valve 256 is closed, mixer 258 may be used to control the flow rate of fresh air circulating between canister 222 and atmosphere. Similarly, if exhaust flow valve 256 is open and vent valve 229 is closed, mixer 258 may be utilized to control the flow rate of exhaust gas into canister 222. In some examples, mixer 258 may comprise multiple valves and chambers, allowing for fresh air and exhaust gas to be mixed within mixer 258 prior to entering vent line 227. In other examples, mixer 258 may be a single valve, such as a three way valve. In some examples, vehicle system 206 may not include mixing valve 258; in such examples, control of mixing exhaust gas and fresh air relies entirely upon valves 256 and 229. The temperature of the exhaust gas-fresh air mixture is higher than fresh air alone, thereby increasing the desorption rate of canisters 222.

After undergoing exhaust after-treatment, exhaust gas may contain a substantial amount of water. Water may damage valves in emissions control system 251. Thus, in some examples, passage 253 may include a condenser 255 disposed therein upstream of exhaust flow valve 256, condenser 255 configured to filter water out of the exhaust gas.

Fuel system 218 and emissions control system 251 are linked by FTIV 252. FTIV 252 may be coupled between fuel tank 220 and canister 222 within conduit 276. FTIV 252 may be opened during engine-on conditions to decrease the pressure in fuel tank 220 by venting fuel vapor to canister 222. During refueling events, FTIV 252 may be opened to decrease the pressure in fuel tank 220 to a threshold. FTIV 252 may be positioned between the fuel system and the evaporative emissions system, the FTIV 252 configured to isolate the fuel tank from the purge when closed. FTIV 252 may be configured to isolate the fuel tank 220 from the evaporative emissions system when closed, such that no other valve may be opened to fluidly couple the fuel system to the evaporative emissions system. FTIV 252 may be configured to isolate the fuel system from the evaporative emissions system when closed and further configured to partially open during fuel tank purging conditions and configured to completely open during refueling conditions. FTIV 252 may be further configured to isolate refueling vapors from diurnal vapors while closed.

The vehicle system 206 may further include a control system 214. Control system 214 is shown receiving information from a plurality of sensors 216 (various examples of which are described herein). As one example, sensors 216 may include exhaust gas sensor 237 located upstream of the emission control device, temperature sensor 233, pressure sensor 291, and canister temperature sensor 243. Other sensors such as pressure, temperature, air/fuel ratio, and composition sensors may be coupled to various locations in the vehicle system 206. As another example, the actuators may include fuel injector 266, throttle 262, fuel tank isolation valve 252, and pump 292. The control system 214 may include a controller 212. The controller may receive input data from the various sensors, process the input data, and trigger the actuators in response to the processed input data based on instruction or code programmed therein corresponding to one or more routines. Control system 214 may be configured with instructions stored in non-transitory memory that cause controller 212 to perform control routines via one or more actuators 281 based on information received via one or more sensors 216.

In some examples, vehicle system 206 may be configured to perform on-board smoke testing to determine the location and size of a leak within evaporative emissions control system 251. During engine-on conditions, canister purge valve 261 and canister vent valve 229 may be closed to seal the emissions control system 251. Exhaust flow valve 256 may then open to allow exhaust gas to enter cross passage 253. Mixer 258 may then be commanded to allow exhaust gas to enter vent line 227. In some examples, mixer 258 may be duty cycled to regulate the flow of exhaust gas into the evap system 251 and thus regulate the increase in evap system pressure. In some examples, mixer 258 may be configured to restrict flow of exhaust gas to the canister vent valve 229 to prevent fouling air filter 259. In other words, exhaust gas entering mixer 258 may only be directed toward the fuel vapor canister. In some examples, during a smoke test, mixer 258 may be placed in a position (e.g., 100% duty cycle) to allow a maximum flow rate of exhaust into evap system 251 until a threshold pressure is reached in evap system 251. In other examples, the conformation of mixer 258 may be ramped to an intermediate state (e.g., gradually increased from a 0% duty cycle) to allow exhaust gas to flow throughout evap system 251 until the threshold pressure is reached. When the evap system pressure reaches the threshold, mixer 258 may be positioned to restrict flow of exhaust gas from exhaust passage 235 into evap system 251, and exhaust flow valve 256 may be closed. The pressurized smoke then moves throughout evap system 251 and will pass through a leak. A technician outside of the vehicle may observe the smoke exiting the evap system 251 through the leak, and in this way may determine the location of the leak. Once the pressure is at the threshold, the pressure decay may be monitored in order to estimate the size of the leak. A method for an on-board smoke test to determine the location and size of a leak within an evap system such as emissions control system 251 is further discussed herein with regard to FIG. 3.

When a leak is detected, controller 212 generates a diagnostic code indicating the presence of a leak. A technician may read the diagnostic code using a diagnostic scan tool (not shown). The diagnostic code may indicate the general location of a leak so that the technician may know that the leak is, for example, on the canister side or the fuel tank side of the FTIV 252. In scenarios where the technician knows a leak is located on the canister side of the FTIV 252 prior to initiating a smoke test, FTIV 252 may be closed prior to circulating smoke through evap system 251 to prevent unnecessarily testing the fuel system. In such scenarios, evap system pressure may be monitored by a pressure sensor (not shown) within evap system 251. In scenarios where the technician knows a leak is located on the fuel tank side of the FTIV 252 prior to initiating a smoke test, FTIV 252 may be opened prior to circulating smoke through evap system 251 to allow smoke to further circulate through fuel system 218. In such scenarios, system pressure may be monitored by FTPT 291.

During non-testing engine-on conditions, the combustion air-fuel ratio may be maintained at stoichiometry. When the air-fuel ratio is maintained at stoichiometry, exhaust gas produced by engine 210 is not visible to the human eye. In examples where vehicle system 206 is configured to perform on-board smoke tests, the combustion air-fuel ratio may be adjusted to change the color of the exhaust gas. For example, the diagnostic scan tool may include a user interface that allows the technician to adjust the engine combustion air-fuel ratio to a rich setpoint where exhaust gas is colored dark gray or black. The rich setpoint may be above a threshold beyond which gray smoke is generated, the threshold dependent on the type of fuel combusted. The technician may select a rich air-fuel ratio setpoint using the diagnostic scan tool, and controller 212 may then use the rich air-fuel ratio setpoint during the smoke test. In some examples, the rich air-fuel ratio setpoint may be preconfigured in controller 212 and may be further adjustable via the scan tool. In this way, the visibility of the exhaust gas may be increased.

In examples where vehicle system 206 is configured to perform on-board smoke tests, engine 210 may be automatically started responsive to controller 212 receiving instructions to initiate a smoke test from a diagnostic scan tool. Engine 210 must run in order to produce exhaust gas. In response to receiving instructions to initiate a smoke test, controller 212 may detect that engine 210 is not running and automatically start engine 210 even if key-on or push-button start conditions are not met. In this way, the workflow of a smoke test may be simplified.

FIG. 3 shows an example method 300 for performing an onboard smoke test using evap hardware in accordance with the current disclosure. Method 300 will be described herein with reference to the components and systems depicted in FIGS. 1 and 2, though it should be understood that the method may be applied to other systems without departing from the scope of this disclosure. Method 300 may be carried out by controller 212, and may be stored as executable instructions in non-transitory memory.

Method 300 may begin at 305. At 305, method 300 may include evaluating operating conditions. Operating conditions may include, but are not limited to, engine status, canister vent solenoid status, canister purge valve status, combustion air-fuel ratio, oxygen content of exhaust, and fuel system pressure. Operating conditions may be measured by one or more sensors 216 and actuators 281 coupled to controller 212, or may be estimated or inferred based on available data. Method 300 may then continue to 310.

At 310, method 300 may include determining if a smoke test has been initiated. A smoke test may be initiated, for example, by an automotive technician using a diagnostic scan tool. If a smoke test is not initiated, method 300 may proceed to 315. At 315, method 300 may include maintaining operating conditions such as those evaluated at 305. Method 300 may then end. If a smoke test is initiated, method 300 may continue to 320.

At 320, method 320 may include determining if the engine 210 is running Engine 210 must be running during a smoke test in order to generate exhaust. If engine 210 is not running, method 300 may proceed to 325, wherein engine 210 is turned on before proceeding to 330. During smoke testing, controller 212 may allow an automatic engine start even if key-on or push button engine start conditions are not met. If engine 210 is running, method 300 may proceed directly to 330.

At 330, method 300 may include closing canister purge valve 261 and canister vent valve 229. Closing canister purge valve 261 and canister vent valve 229 seals the evap system from the engine intake manifold and atmosphere. In scenarios where the technician knows that the leak is on the canister side, 330 may further include closing or maintaining closed FTIV 252. In scenarios where the technician knows that the leak is on the fuel tank side, or does not know the location of a leak, 330 may further include opening or maintaining open FTIV 252. Method 300 may then proceed to 335.

At 335, method 300 may include opening exhaust flow valve 256, allowing unrestricted flow of exhaust gas to mixer 258. Continuing at 340, method 300 may include determining whether a reading from EGO sensor 237 is equal to zero, indicating a rich A/F ratio, and further indicating that the exhaust gas used for the smoke test will not comprise any potentially combustible oxygen. If the EGO sensor is equal to zero, method 300 may proceed to 350. If the EGO sensor reading is greater than zero, method 300 may proceed to 345. At 345, method 300 may include adjusting combustion air-fuel ratio to a rich setting so that the exhaust gas may free of oxygen, and further to comprise a black smoke and thus easily visible. Adjusting combustion air-fuel ratio to a rich setting may be accomplished by adjusting engine intake throttle 262 or by adjusting fuel injection parameters. The desired air-fuel ratio may be input by the automotive technician using the diagnostic scan tool, or may be preconfigured in controller 212. In some examples, even if the EGO sensor reading is zero, the technician performing the smoke test may adjust the A/F ratio to increase a darkness of the exhaust gas, thus making exhaust exiting through a leak easier to identify. Method 300 may then proceed to 350.

At 350, method 300 may include directing exhaust gas through mixer 258 until the evap system pressure reaches a threshold. The evap system pressure may be measured by a pressure sensor within the system, such as FTPT 291. The pressure threshold may be within a range, for example 20 to 30 InH2O. Directing exhaust gas through mixer 258 may include allowing unrestricted flow of exhaust gas through mixer 258 (e.g., opening mixer 258 at 100% duty cycle), or may include ramping up the flow of exhaust gas through mixer 258 (e.g. gradually increasing the duty cycle from 0%). Once the evap system pressure has reached the pressure threshold, method 300 may continue to 355.

At 355, method 300 may include closing exhaust flow valve 256, and may further include placing mixer 258 in a predetermined conformation or duty cycle for the smoke test. Closing exhaust flow valve 256 completely seals evap system 251. Once evap system 251 is isolated, the pressurized smoke may circulate throughout the system and pass through a leak. In this way, an automotive technician outside of the vehicle may identify the location of a leak in evap system 251 by observing where the smoke exits the evap system. Method 300 may then continue to 360.

At 360, method 300 may include determining the leak size from the pressure decay. By monitoring the rate of pressure change within the evap system, the size of the leak orifice can be estimated. The estimated leak size may be sent to the off-board diagnostic scan tool for use by the technician. CVV 229 may then be opened, and FTIV 252 and mixer 258 may be placed in default positions. Method 300 may then end.

FIG. 4 shows an example timeline 400 of an onboard smoke test using the method described herein with regard to FIG. 3 and the system described herein with regard to FIG. 2. Timeline 400 includes plot 410, indicating the status of a smoke test. The smoke test is active during a smoke test and inactive at all other times. Timeline 400 also includes plot 420, indicating the status of the canister vent valve over time; plot 430, indicating the status of the canister purge valve over time; plot 440, indicating the status of the mixer over time; plot 450, indicating the engine status over time; plot 460, indicating the combustion air-fuel ratio over time; plot 470, indicating the status of the exhaust flow valve over time; and plot 480, indicating the pressure measured by the FTPT over time. Dashed line 485 represents a pressure threshold. Plot 440 shows only two states for the mixer status, open and closed; open refers to a fully open configuration of the mixer wherein flow from the passage 253 to canister 222 and canister vent valve 229 is unrestricted, while closed refers to a partially closed configuration of the mixer wherein flow from canister vent valve 229 to canister 222 is unrestricted but flow from passage 253 to canister 222 and canister vent valve 229 is restricted. As described herein with regard to FIG. 2, the mixer may be placeable in a plurality of intermediate conditions. In this example, the fuel tank isolation valve 252 is open throughout the duration of timeline 400.

At time $t_0$, timeline 400 shows the system during normal engine-on non-purging conditions. A smoke test has not been initiated, as shown by plot 410. Plot 420 shows that the canister vent valve is open. The canister purge valve is closed as shown by plot 430. The exhaust gas mixer is closed so that flow from the exhaust cross passage is restricted while flow from the canister vent valve to the canister is unrestricted, as shown by plot 440. The engine is running with a stoichiometric air-fuel ratio, as shown by plots 450 and 460. The exhaust flow valve is closed, as shown by plot 470. The pressure inside the system as measured by the FTPT is stable, as shown by plot 480.

At time $t_1$, a smoke test is initiated and the smoke test status becomes active, as shown by plot 410. The canister vent valve is closed while the canister purge valve is maintained closed, as shown by plots 420 and 430. If the canister purge valve were open prior to time $t_1$, the canister purge valve would close at time $t_1$. If the engine were not running prior to time $t_1$, the engine would turn on at time $t_1$. The combustion air-fuel ratio is commanded to a rich setting and is adjusted until the EGO sensor gives a zero oxygen reading, as shown by plot 460. The exhaust flow valve is maintained closed and the system pressure is unchanged, as shown by plots 470 and 480.

At time $t_2$, the flow valve is opened as shown by plot 470, and the mixer completely opens to allow gas flow from passage 253 into the evap system, as shown by plot 440. Plot 480 shows the pressure increasing while the flow valve and mixer open and exhaust gas enters the system. During this period of time, the smoke circulates throughout the evap system and begins to exit through the leak.

At time $t_3$, the system pressure reaches the predetermined pressure threshold and consequently the exhaust gas flow valve is closed and exhaust flow is restricted through the mixer. The combustion air-fuel ratio is commanded to a normal setting. From times $t_2$ to $t_3$, the smoke test is still active while the smoke leaks out of the system, thereby decreasing the pressure measured by the FTPT. During this time, the automotive technician who initiated the smoke test may observe black smoke exiting the evap system and thereby determine the location of the leak. Meanwhile, the slope of the pressure over time may be monitored and subsequently used to estimate the size of the leak. A smaller slope indicates a smaller leak size, while a larger slope indicates a larger leak size. The leak size estimate may be displayed to the automotive technician via the scan tool, and the size estimate may be useful for determining how to resolve the leak.

At time $t_3$, the smoke test ends. The canister vent valve opens to vent the evap system. The system pressure quickly decays to an equilibrium state, the same pressure state before the smoke test was initiated.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:

during a first condition, routing exhaust gas to a sealed fuel system;

pressurizing the fuel system with the exhaust gas such that exhaust gas will escape from a leak in the fuel system; and responsive to receiving instructions to initiate a smoke test, adjusting a combustion air-fuel ratio to a rich setpoint while operating the engine.

2. The method of claim 1, wherein the combustion air-fuel ratio is further adjusted to reduce an oxygen content of the exhaust gas.

3. The method of claim 1, wherein instructions to initiate a smoke test are received by a vehicle controller from an off-board diagnostic scan tool.

4. The method of claim 3, wherein the rich setpoint of the combustion air-fuel ratio is included in the received instructions to initiate the smoke test.

5. The method of claim 1, wherein routing exhaust gas to the sealed fuel system comprises:

closing a canister purge valve and a canister vent valve;

setting a mixer to a predetermined configuration; and opening an exhaust flow valve.

6. The method of claim 5, further comprising opening a fuel tank isolation valve prior to opening an exhaust flow valve.

7. The method of claim 5, wherein setting the mixer to the predetermined configuration includes restricting a flow of exhaust gas to the canister vent valve.

8. The method of claim 5, wherein setting the mixer to the predetermined configuration includes allowing an unrestricted flow of exhaust gas into the fuel system.

9. The method of claim 5, further comprising:

closing the exhaust flow valve responsive to a fuel system pressure at a threshold;

monitoring a pressure decay rate responsive to closing the exhaust flow valve; and estimating a leak size based on the pressure decay rate.

10. A method for a vehicle including an engine and an evaporative emissions system coupled to an exhaust system, comprising:

closing a canister purge valve and a canister vent valve responsive to receiving instructions to initiate a smoke test;

adjusting an engine combustion air-fuel ratio to a rich setpoint;

opening an exhaust flow valve to allow exhaust gas from the exhaust system to flow into the evaporative emissions system;

closing the exhaust flow valve responsive to an evaporative emissions system pressure at a threshold;

monitoring a pressure decay rate responsive to closing the exhaust flow valve; and estimating a leak size using the pressure decay rate.

11. The method of claim 10, further comprising prior to closing the canister purge valve and the canister vent valve:

determining if the engine is operating; and automatically starting the engine from rest even without an engine start request from a driver responsive to the engine not operating.

12. The method of claim 10, wherein the combustion air-fuel ratio is further adjusted to reduce an oxygen content of the exhaust gas responsive to an exhaust gas oxygen sensor measurement.

13. The method of claim 10, wherein instructions to initiate a smoke test are received by a vehicle controller from an off-board diagnostic scan tool.

14. The method of claim 13, further comprising sending the leak size estimate to the off-board diagnostic scan tool.

15. An evaporative emissions system coupled to an internal combustion engine in a vehicle, comprising:

a canister containing an adsorbent material, the canister fluidly coupled to a fuel system and an engine intake;

a canister purge valve positioned downstream of the canister and upstream of the engine intake;

a canister vent valve positioned in a vent line upstream of the canister and downstream of an atmosphere;

an exhaust flow valve positioned within an exhaust cross passage, the exhaust cross passage coupled between the vent line and an exhaust passage;

a condenser positioned in the exhaust cross passage upstream of the exhaust flow valve, the condenser configured to filter water from exhaust gas; and a controller configured with instructions stored in non-transitory memory that when executed cause the controller to:

close the canister purge valve and the canister vent valve responsive to a smoke test initiation;

open the exhaust flow valve to allow exhaust gas to enter the evaporative emissions system; and close the exhaust flow valve responsive to an evaporative emissions system pressure above a threshold.

16. The system of claim 15, further comprising a mixer positioned at an intersection of the exhaust cross passage and the vent line, the mixer configured to control flow between the exhaust flow valve, the canister vent valve, and the canister.

17. The system of claim 15, wherein the controller is further configured with instructions stored in non-transitory memory that when executed cause the controller to:

monitor a pressure decay rate of the evaporative emissions system; and estimate a leak size using the pressure decay rate.

18. The system of claim 15, wherein the controller is further configured with instructions stored in non-transitory memory that when executed cause the controller to adjust a combustion air-fuel ratio to a rich setpoint.

* * * * *